Patented Aug. 10, 1954

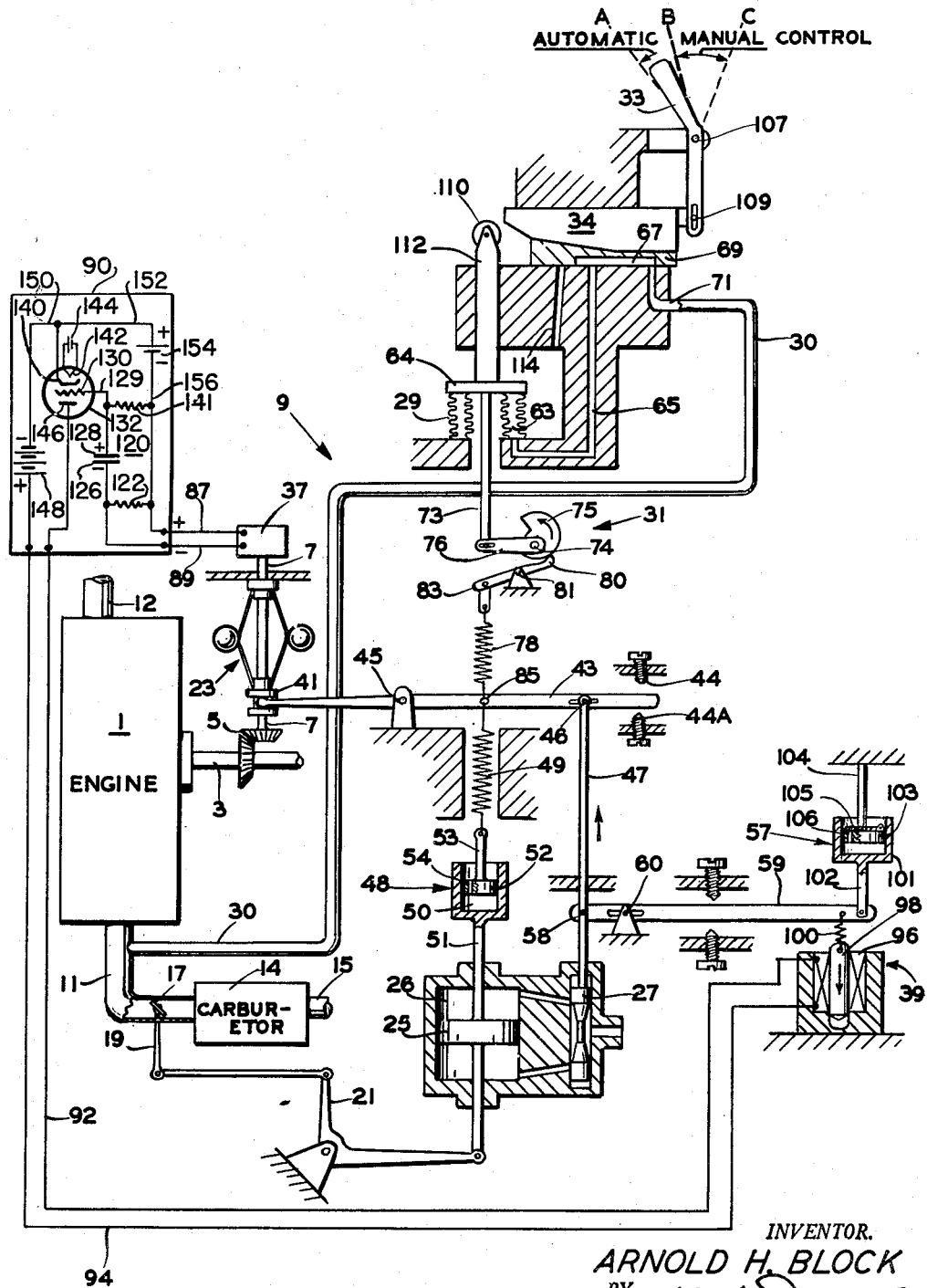

2,685,871

UNITED STATES PATENT OFFICE 2,685,871

LOAD SENSING ENGINE GOVERNOR

Arnold H. Block, Hackensack, N. J., assignor to Bendix Aviation Corporation, Teterboro, N. J., a corporation of Delaware Application January 23, 1951, Serial No. 207,399

16 Claims. (Cl. 123—102)

The present application relates to a load sensing engine governor and more particularly to a novel governor for regulating the speed of an engine for driving electrical, mechanical or hydraulic equipment.

An object of the invention is to provide a load sensitive engine governor including means to schedule engine speed with applied load and means to prevent engine stall with large step changes in loads.

Another object of the invention is to provide a novel governor to automatically regulate the engine speed at some continuous duty rating which is a function of the load applied to the engine and in which the scheduled speed shall be increased with applied load within its operating range, and in which the speed setting schedule shall be such that at least twenty-five per cent of the net horsepower available shall be maintained in reserve for meeting surges and loads above the continuous duty rating.

Another object of the invention is to provide a novel governor in which at low engine speed settings greater reserve power is provided to meet the power requirements for acceleration, dependent upon the maximum load step change to be imposed.

Another object of the invention is to provide such an engine speed governor in which full throttle engine operation up to maximum speed may be obtainable as required for meeting surges and loads above the continuous duty rating.

Another object of the invention is to provide means responsive to the ambient atmospheric pressure for varying the speed setting of the governor with changes in such pressure.

Another object of the invention is to provide means responsive to the ambient atmospheric pressure to increase the speed setting of the governor upon a decrease in the atmospheric pressure and to decrease the speed setting upon an increase in the atmospheric pressure.

Another object of the invention is to provide an engine speed governor including means responsive to an operating condition of the engine which affects the power output of the engine, and means controlled thereby to increase the speed setting of the engine in response to a change in such condition in a sense to effect an increase in the power output and to decrease the speed setting upon a change in such condition in a sense to effect a decrease in the power output.

Another object of the invention is to provide such an engine speed governor in which a novel manually operable means serves to lock the governor at a particular selected speed setting within its operating range for loads requiring a constant speed setting.

Another object of the invention is to provide a novel engine speed governor incorporating easy and adequate adjustments for setting operating limits, calibration and stability.

The above and other objects and features of the invention will appear more fully hereinafter from a consideration of the following description taken in connection with the accompanying drawing wherein one embodiment of the invention is illustrated by way of example.

The drawing is a schematic view of the load sensing engine speed governor forming the subject matter of the present application.

Referring to the drawing, there is shown in outline an internal combustion engine 1 of conventional type driving through a shaft 3 suitable powered equipment not shown and through gearing 5 a shaft 7 of a speed sensing governor indicated generally by the numeral 9.

The engine 1 has a suitable fuel and air intake manifold 11 and an exhaust manifold 12 which discharges to the atmosphere. The intake manifold 11 discharges into the cylinder intakes of the engine 1 and leads from a carburetor 14 of conventional type and having an air inlet conduit 15 and a throttle valve 17. The throttle valve 17 has the usual operating lever 19 adjustably positioned through linkage 21 by the governor 9, as hereinafter explained.

The governor 9 may be considered as made up of the following main components: A flyball speed responsive device 23 driven by shaft 7 from the engine 1; a servo piston 25 slidably mounted in a chamber 26 and controlled by a pilot valve 27 and in which the servo piston 25 is connected through linkage 21 with the carburetor throttle valve 17; bellows 29 sensitive to engine intake manifold pressure and ambient atmospheric pressure and operatively connected to the intake manifold pressure in conduit 11 through a conduit 30; an adjustable cam speed computer mechanism 31; an operator-operative lever 33 and cam 34 for manual speed selection; a speed responsive generator 37 driven by the engine 1 through shaft 7; a deceleration responsive solenoid 39; and suitable links, springs, adjustable stops and dashpots as hereinafter explained.

Speed governor mechanism

The flyball speed responsive device 23 is of conventional design and is arranged to adjustably position a collar 41 slidably mounted on the shaft 7 and operatively connected through a governor lever 43 pivoted at 45 and connected at 46 to a valve stem 47 for adjusting the servo valve 27 upon changes in the engine speed. The movements of the flyballs 23 are restricted to the minimum required for full range operation of the pilot valve 27 by adjustable stops 44 and 44A which limit the movement of governor lever 43.

The piston 25 controlled by the servo valve 27 is connected through a dashpot 48 and spring 49 to the governor lever 43. The dashpot 48 includes a cylinder 50 connected to the piston 25 through a rod 51 and a piston 52 slidably mounted in the cylinder 50 and connected to the spring 49 through a rod 53. A bleed port 54 in the piston 52 permits a restricted flow of air therethrough into the cylinder 50 so that a relatively slow adjustment of the piston 52 in the cylinder 50 is affected under the biasing force of the spring 49 upon adjustment of the piston 25 in a downward direction relative to the dashpot 48. Thus upon adjustment of the piston 25 in a downward direction in response to a decrease in the speed of the engine 1, the piston 25 acting through the dashpot 48 increases the tension applied by spring 49 to the governor lever 43 tending to bias the lever 43 in a clockwise direction so that a follow-up action is imparted by spring 49 to the lever 43 which follow-up action is in turn wiped out by a relatively slow adjustment of the piston 52 in the cylinder 50 under the tension of the spring 49 which adjustment of the piston 52 tends to relieve the tension of the spring 49 on lever 43 in a reset action by the dashopt 48.

The limited travel of the governor lever 43 permitted by the stops 44 and 44A, together with the reset mechanism of the dashpot 48 and spring 55 eliminates load error or droop from the governor by making the position of the flyball speed responsive device 23 independent of the position of the throttle valve 17.

The operation of the servo piston 25 by the pilot valve 27 transforms very small motion of the pilot valve 27 into larger power strokes of the servo piston 25 to which the throttle valve 17 is connected through the linkage 21.

The pilot valve 27 is arranged to provide proportional flow of servo pressure to the servo piston so that the rate of motion of the servo piston 25 will be somewhat proportional to the magnitude of impulses of speed variation. Schematically, the servo valve 27 is shown as having tapered lands which provide a gradual change in port opening to the piston chamber 26 with motion of the valve 27. Action of the pilot valve 27 is damped by a second dashpot 57 operatively connected at 58 to the valve stem 47 by a lever arm 59 pivoted at 60.

*Speed setting mechanism*

The speed setting of the flyball speed responsive device 23 may be varied through operation of the bellows 29 which may be of conventional metallic type, selected so as to be adjustably positioned in accordance with changes in the intake manifold and atmospheric pressure. The schematic drawing shows a single bellows 29 with a chamber 63 and a bellows seal 64. The chamber 63 is operatively connected through a passage 65, an opening 67 in a slidable valve 69, and a passage 71 connected through conduit 30 to the intake manifold pressure in conduit 11 leading to the engine 1.

Atmospheric pressure acts exteriorly on the bellows 29 and thus displacement of the bellows 29 will be dependent upon the difference between the intake manifold pressure applied to the chamber 63 and atmospheric pressure applied exteriorly to the bellows 29 so as to vary the speed setting of the engine 1 with changes in atmospheric pressure as well as changes in the intake manifold pressure.

However, should it be desired that the control of the speed setting of the flyball speed responsive device 23 be independent of changes in atmospheric pressure, the bellows assembly 29 may instead incorporate an evacuated bellows mounted in a sealed chamber and subject exteriorly to the intake manifold pressure as provided in the bellows structure disclosed and claimed in U. S. Patent No. 2,358,845 granted September 26, 1944 to Howard A. Alexanderson and assigned to Bendix Aviation Corporation and which bellows structure may be arranged so that pressure absolute rather than gauge pressures may be measured.

A link 73 leads from bellows seal 64 to a cam speed computer mechanism indicated generally by the numeral 31 and including an adjustable cam 75 rotatable on an axis 74 and positioned through the link 73 and an arm 76 so as to convert the adjusted position of the bellows 29 responsive to the prevailing atmospheric and intake manifold pressures into a proper calibrated displacement of a speed setting spring 78 through adjustment of a cam follower lever 80 pivoted at 81. The speed setting spring 78 is connected at one end to an end 83 of the cam follower lever 80 and at the opposite end 85 to the governor lever 43.

The force applied by the spring 78 to the lever 43 represents the speed setting or null position of the flyball speed responsive device 23, since this force must be balanced by the flyball force in order to bring the control valve 27 to a null position. The cam 75 is so designed that within its operating range the speed setting increases with the intake manifold pressure which in turn increases with the opening of valve 17 in response to an increase in the load applied to the engine 1.

Moreover by properly designing the contour of the cam 75, the speed setting schedule is such that at least twenty-five per cent of the net horsepower available from the engine 1 is maintained in reserve to meet surges and loads above the continuous duty rating and at low engine speed settings greater reserve power is provided to meet the power requirement for acceleration.

The power output of the engine 1 increases with an increase in the intake manifold pressure in conduit 11. Now if the air inlet conduit 15 be pressurized to provide a constant air inlet supply pressure, the power output of the engine 1 will also increase with a decrease in the ambient atmospheric pressure owing to the corresponding decrease in the exhaust counter-pressure effected by such decrease in atmospheric pressure. Thus instead of the bellows 29 only measuring the absolute intake manifold pressure in the conduit 11, the same is arranged, as shown in the drawing, to be responsive to the surrounding ambient atmospheric pressure as well as to the intake manifold pressure in the conduit 11 and is so designed as to vary the position of the cam 75 and the speed setting of the engine 1 in accordance with the power output of the engine 1 as reflected by the prevailing atmospheric and intake manifold pressures. Thus, upon an increase in atmospheric pressure tending to decrease the power output of the engine 1, the cam 75 is adjusted by the bellows 29 so as to decrease the speed setting of the engine 1, while a decrease in atmospheric pressure tending to increase the power output causes the bellows 29 to adjust cam 75 to increase the speed setting of the engine 1.

Similarly an increase in the intake manifold pressure affects the cam 75 so as to increase the speed setting of the engine 1, while a decrease in the intake manifold pressure effects a decrease in the speed setting of the engine 1. Such changes in the intake manifold pressure reflect not only changes in the power output of the engine 1, but also changes in the load applied to the engine 1, since as the load applied to the engine 1 is increased the valve 17 is further opened to increase the intake manifold pressure at conduit 11 in response to a decrease in the speed of the engine 1 below the selected value. A decrease in the load applied to the engine 1 has an opposite effect of permitting the speed of engine 1 to increase causing the speed responsive device 23 to tend to close the valve 17 to decrease the intake manifold pressure.

Of course, if an increase in the atmospheric pressure effects also a corresponding increase in the intake manifold pressure or a decrease in the atmospheric pressure effects also a corresponding decrease in the intake manifold pressure, the change in the one pressure would be counter-balanced by the change in the other pressure acting upon the bellows 29.

The bellows 29 and cam 31 thus provide means for setting the required speed-load characteristics of the control in accordance with changes in the applied load and power output of the engine so as to vary the speed setting of the control in direct relation with change in the applied load and power output of the engine.

*Deceleration control to prevent engine stall*

Further driven by the shaft 7 of the speed responsive device 23 is the accelerometer 37 which consists of a D. C. generator whose electrical output is fed through lines 87 and 89 into a simple capacitor-resistance circuit indicated generally by the numeral 90 of conventional type or the same may be a deceleration responsive circuit of the type disclosed in U. S. application Serial No. 561,083, filed October 30, 1944, by Joel D. Peterson and assigned to Bendix Aviation Corporation.

The circuit 90 is of a type arranged to differentiate the speed signal from the generator 37 and give a D. C. output to lines 92 and 94 proportional to the deceleration of the engine 1. The signal in the circuit 90 is further so biased that only deceleration signals greater than a certain magnitude will cause effective energization of the output lines 92 and 94.

A typical example of the deceleration responsive circuit is shown diagrammatically in the box 90 in which the output lines 87 and 89 of the D. C. generator 37 are shown as leading into a simple capacitor-resistance circuit 120 responsive to the rate of change in the current produced by the generator 37 due to changes in the driven speed thereof. The output line 87 leads from the positive terminal of the D. C. generator 37 while the output line 89 leads from the negative terminal of the generator 37.

In the circuit 120 a load resistance 122 is connected across the lines 87 and 89. There is furthr provided a condenser having a plate 126 connected to the negative line 89 and an opposite plate 128 connected by a line 129 to a grid 130 of an electronic valve 132. Across the lines 87 and 129 is connected a second resistance 141. The electronic valve 132 is provided in the conventional manner with a heater 142 for the cathode 140 and the energizing circuit for the heater is indicated generally by the numeral 144.

The electronic valve 132 has a plate element 146 connected by the output conductor 92 to one end of an electromagnetic winding 96, the opposite end of which is connected by conductor 94 to the positive terminal of a battery or other suitable source of electrical energy indicated generally by numeral 148. The negative terminal of the source of electrical energy 148 is connected by a conductor 150 to the cathode 140. The cathode 140 is also connected by a conductor 152 to the positive terminal of a battery 154 or other suitable source of electrical energy or biasing voltage while the negative terminal of the battery 154 applies through a conductor 156, resistance 141 and conductor 129 a negative bias to the grid 130 tending to retard electron flow through the electronic valve 132 and prevent effective energization of the electromagnetic winding 96, except in the event of a deceleration signal in excess of a predetermined minimum value, as hereinafter explained.

Thus upon the speed of the engine 1 being decelerated at a rate in excess of the critical minimum value, causing a corresponding decrease in the speed of rotation of the D. C. generator 37 and decrease in the output of the D. C. generator 37, it will be seen that the negative charge applied to the condenser plate 126 will likewise be decreased due to a decrease in the voltage drop through the load resistance 122.

Such decrease in the electromotive force acting on the condenser plate 126 will effect a decrease in the electrostatic forces acting in the dielectric material between the condenser plates 126 and 128 so as to cause an electron flow from the condenser plate 126 through resistances 122 and 141 to the opposite condenser plate 128 to equalize the effect of the decrease in electromotive force acting on the condenser plate 126. The condenser plate 128 during such electron discharge period, or the speed decelerating period of the engine 1, acquires a higher potential than the condenser plate 126 due to the fall of potential through the resistances 122 and 141.

The grid 130 connected to the condenser plate 128 thus acquires a more positive charge under the critical deceleration conditions so that electron flow from the cathode 140 to the plate 146 increases so as to in turn cause the effective energization of the electromagnetic winding 96 in the output lines 92 and 94. Of course, upon the deceleration in the engine speed being corrected, the bias applied to the grid 130 becomes more negative whereupon the electron flow through the electronic valve 132 ceases to effectively energize the electromagnetic winding 96.

The output lines 92 and 94 are connected to the electromagnetic winding 96 of the solenoid 39 arranged to actuate a solenoid plunger 98 to in turn actuate through a spring 100 the lever arm 59 to adjustably position the servo valve 27 in a direction, as indicated by the arrow, to affect opening of the throttle valve 17 upon the speed of the engine 1 decelerating in excess of the minimum value determined by the setting of th circuit 90.

The movement of the lever arm 59 under the biasing force of the spring 100 is damped by the dashpot 57. The dashpot 57 has provided a cylinder portion 101 connected by link 102 to the arm 59 and slidably mounted in the cylinder portion 101 is a piston 103 fixedly mounted by a rod 104. A flapper valve 105 is arranged to limit the opening of a bleeder port 106 extending through a piston 103 of the dashpot 57 upon downward movement of the cylinder portion 101 under the biasing force of spring 100 so that adjustment by the solenoid plunger 98 through spring 100 of the lever 59 in a direction to actuate the servo valve 27 in a sense for effecting an opening of the throttle valve 17 upon deceleration is imparted to the lever 59 somewhat more slowly than adjustment of the servo valve 27 in the opposite direction to decrease the opening of the throttle valve 17. In the latter case, the flapper valve 105 does not obstruct the opening of port 106 to the outflow of air from the cylinder portion 101 so that the damping effect of the dashpot 57 on the lever 59 and valve 17 is not so great.

The arrangement of the dashpot 57 in the manner indicated is to provide stability of control and prevent over-adjustment of the throttle valve 17 upon a momentary deceleration of the engine 1 to below the critical value which momentary deceleration is taken care of by the speed responsive device 23 of the regulating system in the normal manner.

Manual control

As shown in the drawing, there is further provided the manually operable lever 33 pivoted at 107 and operably connected at 108 to the cam 34 which has formed integral therewith the slide valve 69. As indicated in the drawing, the cam 34 is shown adjusted in the automatic range. In the latter automatic range, the lever 33 is adjusted to a position between the dotted lines A—B.

Upon adjustment of the lever 33 to within the manual control range indicated by the dotted lines B—C, the cam 34 is adjusted so as to bear upon the roller element 110 mounted at the upper end of a rod 112 projecting from a sealing plate 64 of the bellows 29 so as to manually select the speed setting of the engine 1.

Initial movement of the lever 33 from the range A—B to B—C affects the sliding valve 69 so as to close the opening 67 to the passage 71 and open the valve opening 65 to a passage 114 leading to atmospheric pressure. Thus initial movement of the lever 33 through operation of valve 69 cuts off the intake manifold pressure from the chamber 63 of the bellows 29 and opens the bellows chamber 63 to the atmospheric pressure; subsequent movement of the lever 33 within the manual control range causes the cam 34 to act upon the bellows 29 through the rod 112 and thereby adjust the cam 75 to manually select the engine speed.

Thus the governor forming the subject matter of the present application provides means for setting the speed of the engine automatically in accordance with the applied load and power output of the engine and alternately in accordance with the manual adjustment of the lever 33.

Operation

Upon the governor 9 being set for automatic operation, it will be seen that during constant speed, steady state conditions, a small load increase on the engine 1 resulting in a small decrease of the speed of engine 1 will cause the flyballs of the speed responsive device 23 to come together causing an adjustment of the lever arm 43 in a counter-clockwise direction and the pilot valve 27 to move upward in the direction indicated by the arrow. Servo pressure controlled by the servo valve 27 is then admitted to the piston chamber 26 at the top of the servo piston 25 moving the piston 25 and dashpot 48 downward increasing the tension of spring 49 applied to the governor lever 43 and positioning the throttle valve 27 in an opening direction increasing the intake manifold pressure to the engine 1 and the power output of the engine 1.

As shown in the drawing movement of the governor lever 43 is limited by the stops 44 and 44A so that negligible load error is introduced into the speed setting spring 78.

Now as the servo piston 25 moves the throttle valve 17 towards the open position, the piston 52 of the dashpot 48 moves very slowly relative to the piston 25 so that there is applied to the governor lever 43 through the piston 52 and follow-up spring 49 a biasing force tending to balance the counterforce of the flyball speed responsive device 23, thus bringing the pilot valve 27 back to null and stopping further adjustment of the servo piston 25. During this time, the piston 52 of the dashpot 48 under the biasing force of the follow-up spring 49 is adjusted relative to the piston 25 so as to wipe out the follow-up effect of the spring 49 and reset the governor lever 43 so as to eliminate the load error or follow-up effect that has been introduced by the displacement of the servo piston 25.

The previous action takes place with small decreases in speed. However, should a large increase in the load cause a deceleration of the engine 1 greater than that permitted by the setting of the circuit 90 then the speed responsive generator 37 and solenoid 39 come into operation to prevent the engine 1 going into a stall. A signal from the generator 37 upon such excessive deceleration conditions will cause the electromagnetic winding 96 to actuate the solenoid plunger 98 to increase the tension of the spring 100 applied to the lever 43 which in turn moves the servo pilot valve 27 subject to the retarding effect of the dashpot 57 to bring the throttle valve 17 of the carburetor 14 to maximum throttle to prevent the engine 1 from stalling under load conditions.

In the case of a decrease in the load applied to the engine 1, the speed responsive device 23 senses the resulting increase in engine speed to close the valve 17, decreasing the intake manifold pressure and power output of the engine. Such decrease in the intake manifold pressure in turn causes a decrease in the speed setting of the speed indicator 23 to be effected through the mechanism 31. Thus upon such a decrease in load causing the flyballs of the speed responsive device 23 to move outward, collar 41 to move upward, and a clockwise adjustment of the governor lever 43, the servo valve 27 is moved downward directing servo pressure to the servo piston 25 at the lower end so as to move the same in an upward direction tending to close the throttle valve 17 to in turn decrease the intake manifold pressure applied through the conduit 30 to the chamber 63 of the bellows 29. This, in turn, causes the bellows 29 to collapse moving the cam 75 in a counter-clockwise direction and the cam follower lever which follows the cam surface of the cam 75 to likewise move in a counter-clockwise direction to decrease the tension of the spring 78 and thereby decrease the speed setting of the speed responsive device 23 upon such a decrease in load.

The rate of deceleration of the engine 1 is of course fixed by the setting of the circuit 90 which upon the speed of the engine 1 tending to decrease at an excessive rate affects the solenoid 39 so as to in turn tend to limit the rate of decrease in the speed of the engine 1, as heretofore explained.

The manual speed lever 33 may be adjusted within the manual control range B—C so as to by-pass the automatic load speed scheduling affected through the bellows 29 and effect manual selection of any speed within its operating range independent of load.

Initial movement of the lever 33 cuts off the manifold pressure to the bellows 29 through operation of the valve 69 and opens the bellows 29 to atmospheric pressure; subsequent motion causes cam 34 to act upon the bellows 29 so as to displace it the proper amount for the desired manual speed schedule effected through adjustment of the cam 75.

Although only one embodiment of the invention has been illustrated and described, various changes in the form and relative arrangements of the parts may be made to suit requirements.

What is claimed is:

1. A speed governor for an internal combustion engine having an air intake conduit and a throttle valve for controlling the pressure in said conduit, comprising, in combination, an engine speed responsive device for regulating the throttle valve, means for changing the datum of said engine speed responsive device, operating means for said datum changing means including an engine condition responsive control means and a manually operable control means, and operator-operative means for selectively transferring from one to the other of said control means.

2. The combination defined by claim 1 in which said condition responsive means includes an ambient atmospheric pressure responsive means.

3. The combination defined by claim 1 in which said condition responsive means includes a pressure sensing device responsive to the pressure in the air intake conduit of the engine.

4. The combination defined by claim 1 in which said condition responsive means includes a differential pressure sensing device responsive to the difference between ambient atmospheric pressure and the pressure in the air intake conduit of the engine.

5. The combination defined by claim 1 in which said operator-operative transfer means includes a device operatively connected to said manually operable control means.

6. A load sensitive governor for an engine, comprising an engine speed regulating means, means for changing the datum of said speed regulating means, engine load condition responsive means, means operatively connecting said condition responsive means to said datum changing means so as to schedule engine speed in accordance with the load applied to the engine, and engine operating condition responsive means acting upon said regulating means to increase engine speed to prevent engine stall upon a relatively large increase in the load applied to said engine.

7. A load sensitive governor for an engine, comprising an engine speed responsive means, means for changing the datum of said speed responsive means, engine load condition responsive means, means operatively connecting said condition responsive means to said datum changing means so as to schedule engine speed in accordance with the load applied to the engine, engine deceleration responsive means, engine speed control means, means operatively connecting the speed responsive means to said speed control means, and other means operatively connecting the deceleration responsive means to said speed control means so as to prevent engine stall upon a relatively large increase in the load applied to said engine.

8. A load sensitive governor for an engine, comprising an engine speed regulating means, means for changing the datum of said speed regulating means, engine load condition responsive means, means operatively connecting said condition responsive means to said datum changing means so as to schedule engine speed in accordance with the load applied to the engine, and operator-operative means for connection to said connecting means and arranged to operate said datum changing means independently of said condition responsive means.

9. For use with an internal combustion engine having an induction conduit, an induction throttle valve and an exhaust conduit to atmosphere; a load sensitive engine speed governor comprising an engine speed responsive regulator, means for operatively connecting said regulator to said throttle valve to vary the position of said valve and thereby change the induction pressure so as to maintain a selected engine speed upon a change in the load applied to said engine, means for changing said selected engine speed, a differential pressure responsive device sensitive to the difference between such induction pressure and the ambient atmospheric pressure, means operatively connecting said differential pressure responsive device to said speed changing means to effect a change in the selected engine speed in direct relation to such change in load so as to schedule engine speed in accordance with the load applied to the engine and to effect a change in the selected engine speed in inverse relation to a change in the ambient atmospheric pressure relative to said induction pressure, and engine deceleration responsive means operatively connected to the connecting means between the regulator and throttle valve to open said throttle valve upon excessive deceleration of the engine so as to prevent stalling of the engine upon a relatively large increase in the load applied to said engine.

10. For use with an internal combustion engine having an induction conduit, an induction throttle valve to control the pressure in said induction conduit; a load sensing engine speed governor comprising a flyball speed responsive device sensitive to the speed of the engine, a governor member operable by said device in response to the engine speed, a speed setting spring means biasing said governor member in opposition to said device, a servo valve, means operatively connecting said governor member to said servo valve, a servo piston controlled by said servo valve for positioning the induction throttle valve, a bellows, conduit means operably connecting the induction pressure to one side of the bellows, said bellows being operatively adjusted by changes in the induction pressure, cam means for varying the speed setting of the spring means, and means operatively connecting said bellows to said cam means for varying the speed setting directly with changes in the induction pressure.

11. The combination defined by claim 10 including a manually operable cam, a rod projecting from said bellows and operative by said cam so as to directly control the speed setting cam means independently of said bellows.

12. The combination defined by claim 11 including a transfer valve formed integral with the manually operable cam to close upon a predetermined movement thereof the conduit means connecting the induction pressure to the one side of said bellows and to open said one side of the bellows to atmospheric pressure.

13. The combination defined by claim 10 including deceleration responsive means effective upon deceleration of the engine in excess of a predetermined value, an auxiliary member operatively connecting said deceleration responsive means to the means connecting said governor member to said servo valve, auxiliary spring means for biasing said auxiliary member in a direction to operate said servo valve in a direction for opening said throttle valve, and motor means controlled by said deceleration responsive means for effecting operation of said auxiliary spring means.

14. The combination defined by claim 13 including means for retarding adjustment of said auxiliary member by said auxiliary spring means upon a momentary deceleration of the engine.

15. The combination defined by claim 13 in which the retarding means includes a dashpot and a flapper valve means arranged to retard adjustment of said auxiliary member by said auxiliary spring means upon a momentary deceleration of the engine while permitting a damped adjustment of the auxiliary member in an opposite direction upon cessation of the deceleration.

16. For use with an internal combustion engine having an induction conduit, an induction throttle valve to control the pressure in said induction conduit and an exhaust conduit to atmosphere, a load sensitive engine speed governor comprising a flyball speed responsive device sensitive to speed of the engine, a governor member operable by said device in response to the engine speed, a speed setting spring means biasing said governor member in opposition to said device, a servo valve, means operatively connecting said governor member to said servo valve, a servo piston controlled by said servo valve for positioning the induction throttle valve, a differential pressure responsive bellows, conduit means operably connecting the induction pressure to one side of the bellows, the bellows being subject at the other side to the ambient atmospheric pressure, and said bellows being sensitive to the difference between the induction pressure and said ambient atmospheric pressure, cam means for varying the speed setting of the spring means, and means operatively connecting said bellows to said cam means for varying the speed setting directly with changes in the induction pressure relative to said ambient atmospheric pressure and inversely with changes in the ambient atmospheric pressure relative to said induction pressure.

References Cited in the file of this patent

UNITED STATES PATENTS

| Number | Name | Date |
|---|---|---|
| 2,221,201 | Pope, Jr., et al. | Nov. 12, 1940 |
| 2,529,437 | Weinberger | Nov. 7, 1950 |
| 2,555,784 | Catford | June 5, 1951 |